(12) United States Patent
Duong et al.

(10) Patent No.: US 10,202,904 B2
(45) Date of Patent: Feb. 12, 2019

(54) SYSTEM AND APPARATUS FOR DIVERSIFIED GEARBOX

(71) Applicant: United Technologies Corporation, Farmington, CT (US)

(72) Inventors: Hung Duong, Unionville, CT (US); Nathan Snape, Tolland, CT (US); Gabriel L. Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 30 days.

(21) Appl. No.: 15/803,418

(22) Filed: Nov. 3, 2017

(65) Prior Publication Data

US 2018/0058332 A1 Mar. 1, 2018

Related U.S. Application Data

(62) Division of application No. 14/596,692, filed on Jan. 14, 2015, now Pat. No. 9,845,735.

(51) Int. Cl.
*F02C 7/36* (2006.01)
*F02C 7/32* (2006.01)
(Continued)

(52) U.S. Cl.
CPC ............... *F02C 7/32* (2013.01); *F01D 15/12* (2013.01); *F02C 3/04* (2013.01); *F02C 7/36* (2013.01);
(Continued)

(58) Field of Classification Search
CPC ............... F02C 7/36; F05D 2260/4031; F05D 2260/53; F16H 1/222; F16H 2057/02026
(Continued)

(56) References Cited

U.S. PATENT DOCUMENTS 8,347,637 B2 * 1/2013 Suciu ..................... F02C 7/32
60/802
2016/0201567 A1 7/2016 Duong et al.

FOREIGN PATENT DOCUMENTS

EP 2390486 11/2011
EP 2522832 11/2012

OTHER PUBLICATIONS

Extended European Search Report dated May 31, 2016 in European Application No. 16151182.9.
(Continued)

*Primary Examiner* — Steven Sutherland
(74) *Attorney, Agent, or Firm* — Snell & Wilmer, L.L.P.

(57) ABSTRACT

A gas turbine engine assembly comprising, a gearbox including a first housing that includes a first auxiliary gear drive on a first portion thereof, a second housing that includes a second auxiliary gear drive on a second portion thereof, and a third housing that includes a third auxiliary gear drive on a third portion thereof, the housings being interconnected so that the first portion of the first housing, the second portion of the second housing and the third portion of the third housing form a substantially triangular polyhedron shape, with the second portion of the second housing disposed between the first portion of the first housing and the third portion of the third housing. The first auxiliary gear drive, the second auxiliary gear drive and the third auxiliary gear drive project outwardly in mutually divergent directions.

6 Claims, 7 Drawing Sheets

(51) Int. Cl.
*F02C 3/04* (2006.01)
*F16H 57/025* (2012.01)
*F16H 57/038* (2012.01)
*F01D 15/12* (2006.01)
*F16H 1/22* (2006.01)
*F16H 57/02* (2012.01)

(52) U.S. Cl.
CPC ......... *F16H 57/025* (2013.01); *F16H 57/038* (2013.01); *F05D 2250/11* (2013.01); *F05D 2250/314* (2013.01); *F05D 2260/4031* (2013.01); *F05D 2260/532* (2013.01); *F16H 1/222* (2013.01); *F16H 57/02* (2013.01)

(58) Field of Classification Search
USPC ....................................................... 74/606 R
See application file for complete search history.

(56) References Cited

OTHER PUBLICATIONS

USPTO; Restriction Requirement Office Action dated Mar. 28, 2017 in U.S. Appl. No. 14/596,692.
USPTO; Non-Final Office Action dated Jun. 30, 2017 in U.S. Appl. No. 14/596,692.
USPTO; Pre-Interview First Office Action dated Jun. 30, 2017 in U.S. Appl. No. 14/596,692.
USPTO; Notice of Allowance dated Sep. 19, 2017 in U.S. Appl. No. 14/596,692.
EP Office Action dated Sep. 22, 2017 in European Application No. 16151182.9.

\* cited by examiner

SYSTEM AND APPARATUS FOR DIVERSIFIED GEARBOX

CROSS REFERENCE TO RELATED APPLICATION

This application is a divisional of, and claims priority to, U.S. application Ser. No. 14/596,692, filed Jan. 14, 2015 and entitled "SYSTEM AND APPARATUS FOR DIVERSIFIED GEARBOX," which is hereby incorporated by reference in its entirety.

FIELD

The present disclosure relates to a gearbox for a gas turbine engine.

BACKGROUND

A typical gas turbine engine for an aircraft may include an accessory drive gearbox. The gearbox is rotationally coupled to at least one spool of the engine by a tower shaft. The gearbox may be coupled to an engine core and enclosed by a core nacelle surrounding the engine core. A compact gearbox configuration may be desirable to fit within the space between the core nacelle and engine core. Reducing inventory of spare parts and the need for multiple dissimilar components is also desirable.

SUMMARY

A system and method for coupling accessories to a gearbox of a turbine engine are described herein. In one exemplary embodiment, a first housing that includes a first auxiliary gear drive on a first portion thereof, a second housing that includes a second auxiliary gear drive on a second portion thereof, and a third housing that includes a third auxiliary gear drive on a third portion thereof. The housings are interconnected so that the first portion of the first housing, the second portion of the second housing and the third portion of the third housing form a substantially triangular polyhedron shape, with the second portion of the second housing disposed between the first portion of the first housing and the third portion of the third housing. The gear drives project outwardly in mutually divergent directions.

In a further embodiment of any of the above, the first faces of the first and second housing portions are provided respectively by removable first and second covers.

In a further embodiment of any of the above, a first set of bevel gears interconnects the first and third gear sets. A second set of bevel gears interconnects the second and third gear sets.

In a further embodiment of any of the above, accessory drive components are secured to the accessory drive component mounts.

In a further embodiment of any of the above, each of the first faces of the first and second housing portions includes accessory drive component mounts.

In another exemplary embodiment, a gas turbine engine includes an engine static structure housing a compressor section, a combustor section and a turbine section. A spool supports at least a portion of each of the compressor and turbine sections for rotation about an axis. A gearbox is supported by the engine static structure and is coupled to the spool by a tower shaft. A gas turbine engine assembly comprising, a gearbox including a first housing that includes a first auxiliary gear drive on a first portion thereof, a second housing that includes a second auxiliary gear drive on a second portion thereof, and a third housing that includes a third auxiliary gear drive on a third portion thereof, the housings being interconnected so that the first portion of the first housing, the second portion of the second housing and the third portion of the third housing form a substantially triangular polyhedron shape, with the second portion of the second housing disposed between the first portion of the first housing and the third portion of the third housing. The first auxiliary gear drive, the second auxiliary gear drive and the third auxiliary gear drive project outwardly in mutually divergent directions.

In a further embodiment of any of the above, gears of the first, second and third auxiliary drives and/or gear sets each include an axis. The gear axes of the first gear set are perpendicular to a first plane. The gear axes of the second gear set are perpendicular to a second plane. The gear axes of the third gear set are perpendicular to a third plane. The first and second planes are non-parallel to one another. The first, second and third planes are transverse to one another. The gear axes of the first and second gear sets are arranged circumferentially with respect to the axis.

In a further embodiment of any of the above, the intermediate housing portion includes first and second faces opposite one another. The input shaft extends through the first face of the intermediate housing portion and is coupled to the third gear set.

In a further embodiment of any of the above, the second face of the intermediate housing portion includes a tower shaft cover removably secured to the intermediate housing portion over an opening sized to receive the tower shaft.

In a further embodiment of any of the above, the first and second faces of each of the first and second housing portions are parallel to one another.

In a further embodiment of any of the above, the second faces are about 90° apart, and the intermediate housing portion is about 120° apart from each of the first and second housing portions. The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Different cross-hatching and/or surface shading may be used throughout the figures to denote different parts but not necessarily to denote the same or different materials.

Figure 1A:
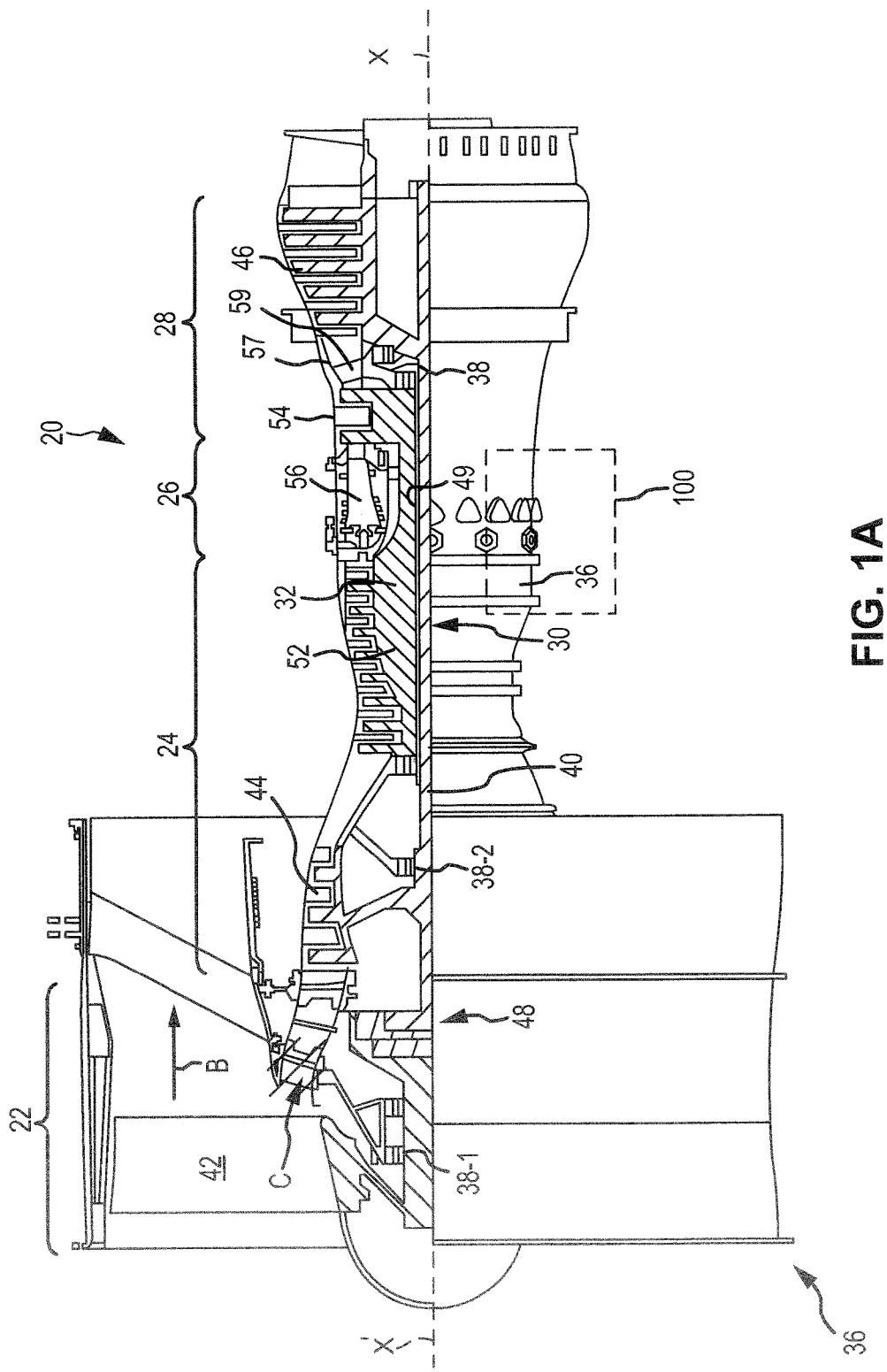
FIG. 1A is a cross-sectional view of a gas turbine engine, in accordance with various embodiments.

FIG. 1A schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis X relative to an engine static structure 36 via various bearing systems 38. It should be understood that various bearing systems 38 at various locations may alternatively or additionally be provided.

The low speed spool 30 generally includes an inner shaft 40 that connects a fan 42 and a low pressure (or first) compressor 44 section to a low pressure (or first) turbine 46 section. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor 52 section and a high pressure (or second) turbine section 54. The inner shaft 40 and the outer shaft 50 are concentric and rotate via the various bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports various bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density is achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

Figure 1B:
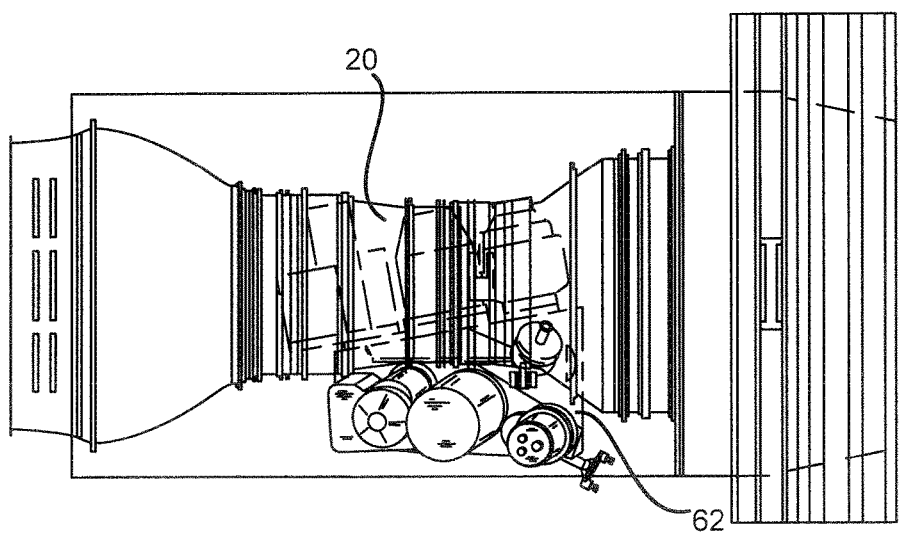
FIG. 1B is a cross-sectional view of a gas turbine engine and diversified gearbox, in accordance with various embodiments.

With continuing reference to FIG. 1B, a gearbox 62 coupled to a gas turbine engine 20 is illustrated. A core nacelle is arranged about the engine static structure 36 and encloses the gearbox 62.

Figure 2:
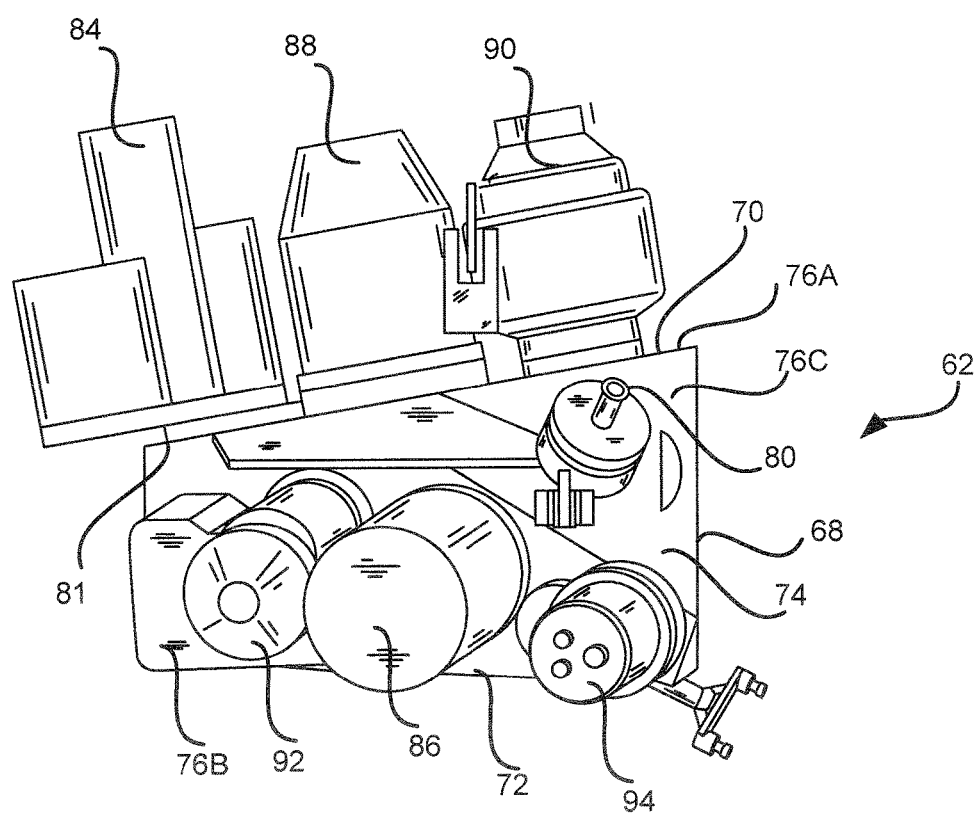
FIG. 2 is a perspective view of a gearbox, in accordance with various embodiments.

As illustrated in FIG. 2, the gearbox 62 is operatively coupled to the high spool by a tower shaft. For example, the tower shaft is rotationally driven by a high spool via a gear set, which is provided by beveled gears. The tower shaft is connected to an input shaft 80 that is supported by the gearbox 62. The input shaft 80 provides the rotational coupling to various accessory drive components 84, 86, 88, 90, 92, and 94. Gearbox 62 assists with external line connection and maintenance due to components being mounted on the axial surface. Stated another way, gearbox 62 assists with external line connection and maintenance due to components being mounted parallel with the engine axis. Gearbox 62 adds flexibility to a gas turbine engine assembly. Mounting surfaces are angled in various positions to fit the components in the package envelope.

The gearbox 62 is provided by a generally a triangular polyhedron shaped structure housing 68 having a first housing portion 70 and second housing portion 72 interconnected to one another by an intermediate housing portion 74. The intermediate housing portion 74 supports the input shaft 80. The first housing portion 70 includes a first face 76A. The second housing portion 72 includes a first face 76B. The intermediate housing portion 74 includes a first face 76C. The first faces 76A-C are adjacent to the engine static structure 36, with brief reference to FIG. 1A. The first face 76C of intermediate housing portion 74 forms a triangle bounded on two sides by an edge 625, 635 of the first face of the first and second housing portions (with brief reference to FIG. 6).

Instead of mounting the accessory drive components such that their rotational axes are in the same direction as the core engine axis X, with brief reference to FIG. 1A, the accessory drive components are mounted on both of the first faces 76A, 76B, on the first and second housing portions 70, 72, as desired. That is, the axes of the accessory drive components 84, 86, 88, 90, 92, and 94 are arranged circumferentially relative to the engine static structure 36 (with brief reference to FIG. 1A). The gearbox 62 comprises a plurality of independent gear trains with a triangle shaped intermediate housing portion 74 to give more space for long components. The gearbox 62 can be adjusted in any direction by changing the shaft angle of bevel gear sets 116 and 118, rotate the mounting surfaces around input shaft 80 or moving the first set of first and second idler gears 122 and 124, also known a spur gears, forward or aft to allow the long component fit in given space, with brief reference to FIG. 3).

As illustrated in FIG. 2, a variable frequency generator (VFG) 88, air turbine starter 90, and a lubrication pump 84 are mounted to the first face 76A. A hydraulic pump 86, a fuel pump 92, and a permanent magnet alternator (PMA) 94 are mounted to the first face 76B.

An integrated drive generator (IDG), and/or a deoiler is optionally mounted to at least one of first face 76A or first face 76B. In this manner, the axial length of the gearbox 62 and its arrangement of accessory drive components 84, 86, 88, 90, 92, 94 are reduced compared to axially oriented accessory drive components. As a result, the gearbox 62 and accessory drive components 84, 86, 88, 90, 92, 94 are positioned easily along the length of the engine static structure 36 to more desirable locations where more space and/or cooler temperatures are provided.

Figure 3:
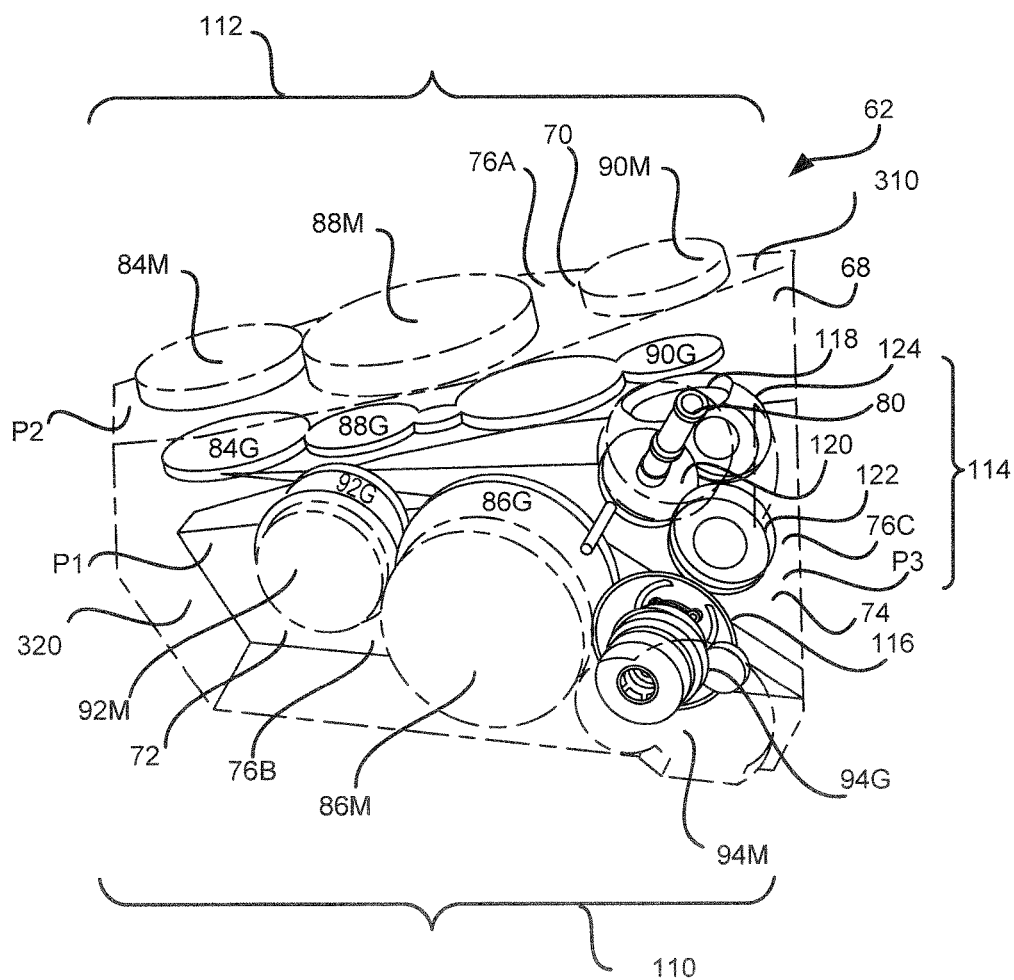
FIG. 3 is a view of the gears of a gearbox, in accordance with various embodiments.

The mounting locations 84M, 86M, 88M, 90M, 92M, 94M for the accessory drive components 84, 86, 88, 90, 92, 94 are shown in more detail as 84M, 86M, 88M, 90M, 92M, 94M in FIG. 3. Like numerals are used to indicate an association amongst components. The first faces 76A, 76B of the first housing portion 70 and second housing portion 72 are provided by a removable a first cover 310 and a second cover 320 that selectively provide access to an interior of the generally a triangular polyhedron shaped housing 68 within which the gear train is mounted.

Figure 4:
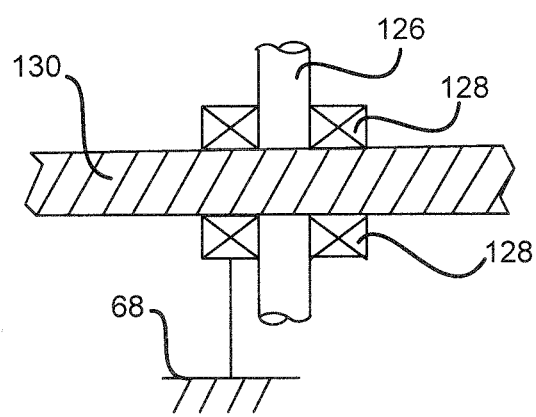
FIG. 4 is a view of gears and bearing of a gearbox, in accordance with various embodiments.

The covers are removable to provide access to any gear 130, which are mounted to the shafts 126, which are supported by bearings 128 relative to the housing 68, as shown in FIG. 4. In this manner, the bearings 128 and gears 130 are easily serviced.

Figure 5:
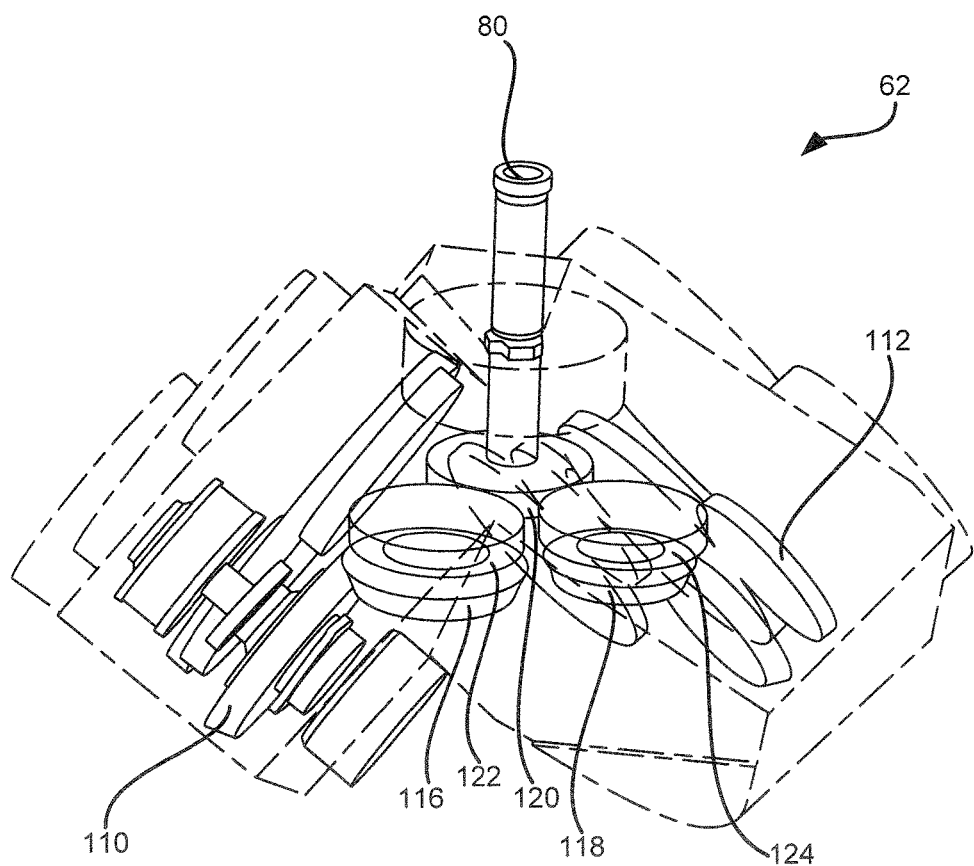
FIG. 5 is a view of the bevel gearsets of a gearbox, in accordance with various embodiments.

With reference to FIG. 3, the first, second and intermediate housing portions 70, 72, 74 respectively house first, second and third gear sets 110, 112, 114. The first gear set 110 is operatively connected to the third gear set 114 by a first bevel gear set 116. The second gear set 112 is operatively coupled to the third gear set 114 by the second bevel gear set 118, with reference to FIG. 5. The input shaft 80 rotationally drives an input gear 120 which rotationally drives the first and second gear sets 110, 112 via first and second idler gears 122, 124. The first gear set 110 includes gears 86G, 92G, 94G, that respectively rotationally drive the hydraulic pump 86, a fuel pump 92, a permanent magnet alternator (PMA) 94. The second gear set 112 includes second gears 84G, 88G, 90G, 88G that respectively drive the back-up variable frequency generator (VFG) 88, air turbine starter 90, and the lubrication pump 84.

As can be appreciated by FIG. 3, the gears of the first gear set 110 are parallel with one another relative to a plane P1. The gears of the second gear set 112 are parallel with one another with respect to a second plane P2. First face 76A intersects with first face 76B along common edge 81. The gears of the third gear set 114 are parallel with one another with respect to a third plane P3. The planes P1-P3 are independent and not parallel relative to one another.

Figure 6:
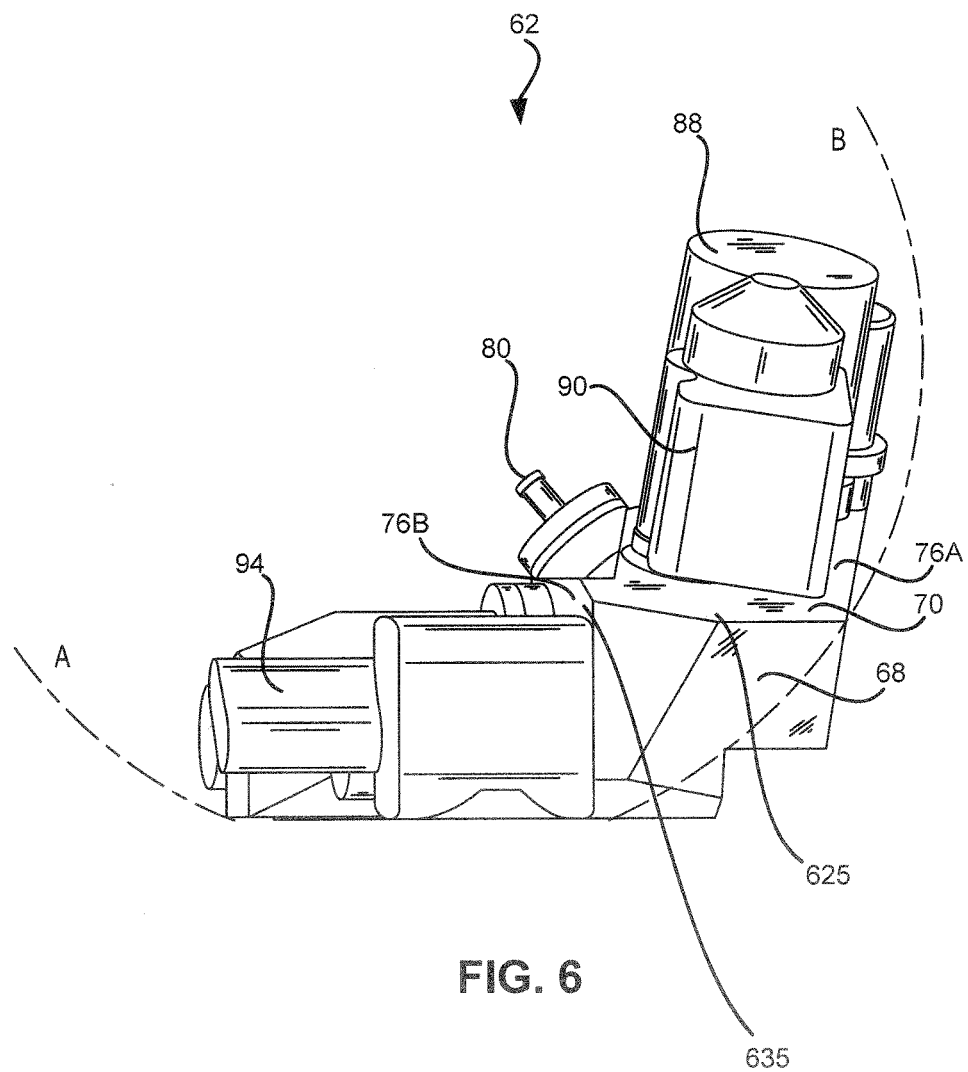
FIG. 6 is a view of mounting surface angle options to accommodate components, in accordance with various embodiments.

As illustrated in FIG. 6, first face 76A or first face 76B are angled at desired orientations to accommodate accessory drive components 84, 86, 88, 90, 92, 94, such as the distance measured from the first face 76A or first face 76B of accessory drive components 84, 86, 88, 90, 92, 94. Narrowing dimensions of first face of 76C of the intermediate housing portion 74 of gearbox 62 assists with creating space in location A and location B for further component extension from first face 76A or first face 76B.

Accordingly, the mounting surfaces of gearbox 62 can be adjusted in any direction by changing the shaft angle of bevel gear sets and rotating the mounting surfaces around the input shaft in kind. Also, the mounting surfaces of gearbox 62 can be adjusted by moving the first set of spur gears forward or aft to allow a long component to fit in given space.

Benefits, other advantages, and solutions to problems have been described herein with regard to specific embodiments. The scope of the disclosure, however, is provided in the appended claims.

What is claimed is:

1. An intermediate housing portion of a gearbox for a gas turbine engine comprising:
    a generally triangular polyhedron shape;
    a coupling with a first housing portion, wherein the first housing portion comprises a first housing portion first face, and wherein a first auxiliary gear drive is arranged within the first housing portion;
    a coupling with a second housing portion, wherein the second housing portion comprises a second housing portion first face, and wherein a second auxiliary gear drive is arranged within the second housing portion,
    wherein the first housing portion first face and the second housing portion first face intersect along a common edge distal the intermediate housing portion; and a third auxiliary gear drive arranged within the intermediate housing portion, wherein the first auxiliary gear drive comprises a first rotational axis, the second auxiliary gear drive comprises a second rotational axis, and the third auxiliary gear drive comprises a third rotational axis, wherein the first rotational axis, the second rotational axis, and the third rotational axis extend outwardly in mutually divergent directions such that the first rotational axis, the second rotational axis, and the third rotational axis are non-parallel to one another.

2. The intermediate housing portion of the gearbox of claim 1, wherein at least one of the first housing portion first face or the second housing portion first face includes a removable cover.

3. The intermediate housing portion of the gearbox of claim 1, wherein a first set of bevel gears interconnects the first auxiliary gear drive and the third auxiliary gear drive, and a second set of bevel gears interconnects the second auxiliary gear drive and the third auxiliary gear drive.

4. The intermediate housing portion of the gearbox of claim 1, further including accessory drive components mounted to at least one of the first housing portion first face or the second housing portion first face.

5. The intermediate housing portion of the gearbox of claim 1, wherein a generally triangular shaped first face of the intermediate housing portion of the gearbox is angled between 60 degrees and 90 degrees relative to the first housing portion first face and the second housing portion first face.

6. The intermediate housing portion of the gearbox of claim 1, wherein a first face of the intermediate housing portion of the gearbox comprises a triangle bounded on a first side by a first edge of the first housing portion first face and bounded on a second side by a second edge of the second housing portion first face.

* * * * *